(12) United States Patent
Weksler et al.

(10) Patent No.: US 7,917,916 B2
(45) Date of Patent: Mar. 29, 2011

(54) IT ADMINISTRATOR INITIATED REMOTE HARDWARE INDEPENDENT IMAGING TECHNOLOGY

(75) Inventors: Arnold S. Weksler, Raleigh, NC (US); Neal R. Caliendo, Jr., Raleigh, NC (US); Jeffrey M. Estroff, Cary, NC (US); Scott E. Kelso, Durham, NC (US); John C. Mese, Cary, NC (US); Nathan J. Peterson, Raleigh, NC (US); Jose R. Ruiz, Raleigh, NC (US); Rod D. Waltermann, Rougemont, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 1317 days.

(21) Appl. No.: 11/472,494

(22) Filed: Jun. 20, 2006

(65) Prior Publication Data
US 2007/0294465 A1   Dec. 20, 2007

(51) Int. Cl.
*G06F 9/44*   (2006.01)
*G06F 13/00*   (2006.01)

(52) U.S. Cl. ........................................ 719/321; 711/100

(58) Field of Classification Search ................ 719/310, 719/321; 711/161, 162, 100
See application file for complete search history.

(56) References Cited

U.S. PATENT DOCUMENTS

| | | | |
|---|---|---|---|
| 5,907,672 A * | 5/1999 | Matze et al. | 714/8 |
| 5,978,856 A | 11/1999 | Jones | |
| 6,141,722 A | 10/2000 | Parsons | |
| 6,282,621 B1 | 8/2001 | Parsons | |
| 6,377,714 B1 * | 4/2002 | Hilbert et al. | 382/312 |
| 6,460,123 B1 | 10/2002 | Blumenau | |
| 6,718,446 B1 * | 4/2004 | Peters et al. | 711/162 |
| 6,961,908 B2 * | 11/2005 | Phillips | 715/839 |
| 7,334,099 B2 * | 2/2008 | Witt et al. | 711/162 |
| 7,343,052 B2 * | 3/2008 | Roth et al. | 382/299 |
| 7,356,679 B1 * | 4/2008 | Le et al. | 713/1 |
| 7,506,142 B2 * | 3/2009 | Yoshimura et al. | 713/1 |
| 2004/0003103 A1 * | 1/2004 | Witt et al. | 709/231 |
| 2009/0089463 A1 * | 4/2009 | Iga | 710/37 |

* cited by examiner

*Primary Examiner* — Van H Nguyen
(74) *Attorney, Agent, or Firm* — Ference & Associates LLC

(57) ABSTRACT

The present invention relates to a method for removing the driver map component from being stored on the service partition and placing it on a server for retrieval at a later time. Only the actual device drivers that are required for that system will be provided. A central repository will be provided for applications and device drivers that would leverage the AMT area. The AMT IDE-R would be used to store the hook to network install, for example an IT administrator initiated network install to an unpowered system. Two situations exist in which this method will be used. The first situation involves supplying ImageUltra content to a system that is connected to the Local Area Network while ImageUltra is running. The second situation involves supplying ImageUltra content to a system that is not connected to the Local Area Network while ImageUltra is running.

12 Claims, 1 Drawing Sheet

# IT ADMINISTRATOR INITIATED REMOTE HARDWARE INDEPENDENT IMAGING TECHNOLOGY

FIELD OF THE INVENTION

The present invention relates generally to facilitating the acceptance of images on end-user systems.

BACKGROUND OF THE INVENTION

One of the most time-consuming tasks facing information technology (IT) departments today is the creation and deployment of images for end-user systems. In large enterprises, the process can be daunting and expensive, as each client or workgroup requires various applications and tools that differ according to their role in the organization. For example, global organizations may require images with specific language elements, which in turn requires that a separate image be created for each business unit. Additionally, the number of images will increase depending on hardware and software requirements; this is because various driver libraries and installed applications change according to specific system characteristics and business requirements.

"ImageUltra" is a technology that addresses this issue. This technology has already issued as U.S. Pat. No. 6,944,867B2, and is herein incorporated by reference. This approach allows IT administrators to reduce the number of unique images they need to deploy systems throughout the company. As contemplated therein, there are four key elements to consider when creating an image: language, hardware platform, operating system, and workgroup applications.

ImageUltra contains three tools that eliminate the need for numerous separate images. The first tool is Dynamic Operating Environment (DOE), which consolidates different languages and operating systems into one master image. DOE then provides an interface that allows the IT specialist or user to select the right language and Operating System for particular business needs. The second tool is Hardware Independent Imaging Technology (HIIT), which is an intelligent mechanism that enables the image to adjust to the Lenovo hardware environment without the need for a new image. The HIIT is a hardware independent, self contained area of the drive which holds the drivers for the system. It includes an area for the generic Operating System and application data and another driver specific area. HIIT will detect the correct drivers needed for a particular Lenovo PC and install them from the embedded driver modules, which reside on a hidden partition on the local hard drive. The third tool is Software Delivery Assistant (SDA), which is a software tool that allows creation of an image with multiple applications for the entire company or for individual workgroups (by functional group or division, for example).

Appropriate programs can be selectively installed via a menu. Using these tools, IT professionals can create a master image that contains elements for every possible configuration used throughout their organization. It is pre-loaded (either by Lenovo or the customer's IT department) on new Lenovo systems. During the initial boot process, the proper configuration is selected via a menu-driven interface. All pertinent applications, drivers and operating system settings are installed automatically. Then, after the image has been installed, the IT professional can choose whether to keep the entire master image, keep only the installed components, or keep nothing at all.

Currently, a user managing a system using ImageUltra is required to have a service partition or other data area which contains ImageUltra and utilities along with the Operating System and drivers. The information pertinent to the drivers is stored in a driver map, which is a table based index of all the drivers that could be used by ImageUltra for any system. This driver map calls out numerous device drivers that may or may not be required on a given system. These unnecessary drivers consume space on the service partition or other data area, as well as space for drivers placed in the Windows Operating System to enable Plug 'n Play (PnP) support. Even if the drivers and Operating System components are on a server, the ImageUltra boot and utilities must be located on the local system. This consumes space that could be used by the end user, and may contain out of date drivers and Operating System components should the user need to re-image at a later date. Additionally, this solution requires the system to be powered on for the discovery of needed drivers, and download of components.

Thus, a need has been recognized in connection with providing a method or system which is able to more efficiently store only those drivers that are necessary for a current image.

SUMMARY OF THE INVENTION

The present invention relates, in accordance with at least one presently preferred embodiment, to a method for removing the driver map component from being stored on the service partition and instead placing it on a server for retrieval at a later time. Only the actual device drivers that are required for that system will be provided resulting in reduced hard drive waste. A central repository will be provided for applications and device drivers that would preferably leverage the Active Management Technology (AMT) area. Additional information on AMT may be found at http colon forward slash forward slash www dot intel dot com forward slash technology forward slash manage forward slash iamt.

In summary, one aspect of the present invention provides an apparatus for facilitating the provision of an image at an end-user system, the apparatus comprising: an arrangement for accepting a master image at an end-user system; an arrangement for facilitating customization of the master image to an end-user system; and n arrangement for storing a driver map elsewhere than a service partition, the driver map relating to drivers usable by the arrangement for accepting a master image.

Another aspect of the present invention provides a method for facilitating the provision of an image at an end-user system, the method comprising the steps of: accepting a master image at an end-user system; facilitating customization of the master image to an end-user system; and storing a driver map elsewhere than a service partition, the driver map relating to drivers usable by the step for accepting a master image.

Furthermore, an additional aspect of the present invention provides a program storage device readable by machine, tangibly embodying a program of instructions executable by the machine to perform method steps for facilitating the provision of an image at an end-user system, the method comprising the steps of: accepting a master image at an end-user system; facilitating customization of the master image to an end-user system; and storing a driver map elsewhere than a service partition, the driver map relating to drivers usable by the step for accepting a master image.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
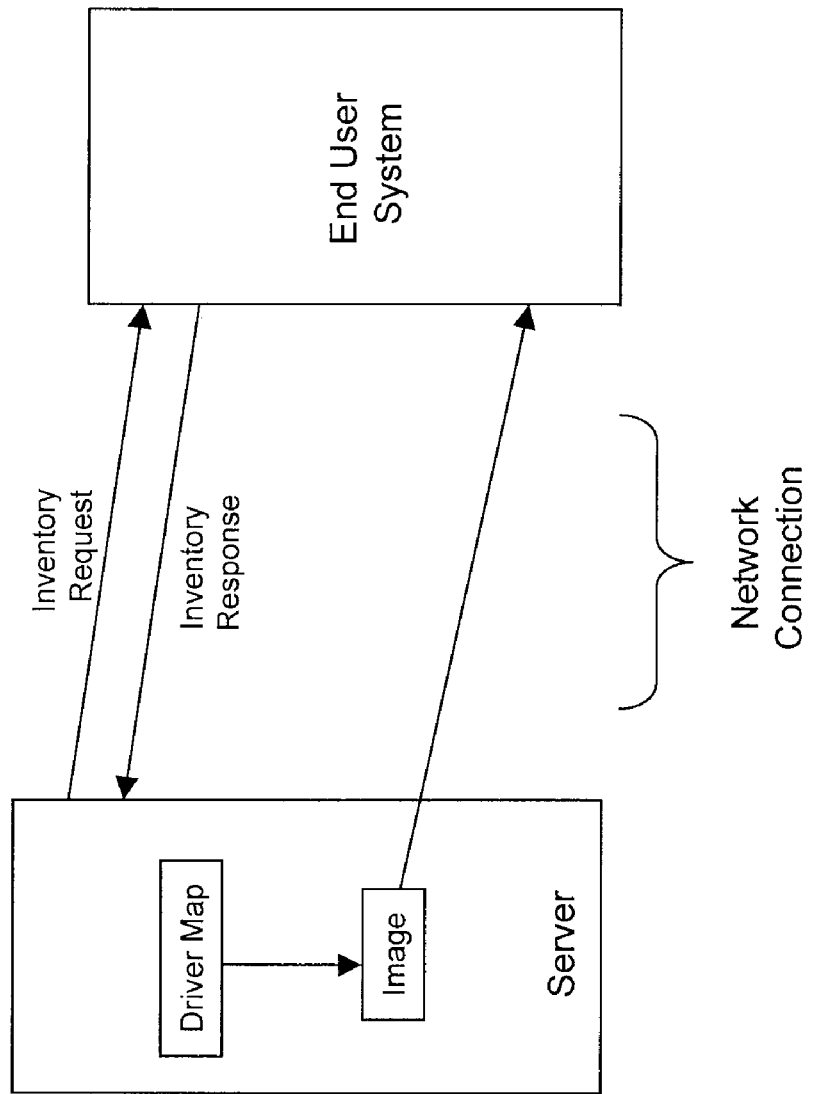
FIG. 1 illustrates a method for IT administrator initiated remote hardware independent imaging.

FIG. 1 illustrates a method for IT administrator initiated remote hardware independent imaging. As mentioned above, the present invention relates to a method for removing the driver map component from being stored on the service partition and instead placing it on a server for retrieval at a later time. Only the actual device drivers that are required for that system will be provided resulting in reduced hard drive waste. A central repository will be provided for applications and device drivers that would leverage the AMT area. The AMT IDE-R would be used to store the hook to network install, for example an IT administrator initiated network install to an unpowered system. There are two main situations in which this method can be used (though of course a variety of other situations are conceivable). The first situation involves supplying ImageUltra content to a system that is connected to the Local Area Network while ImageUltra is running. The second situation involves supplying ImageUltra content to a system that is not connected to the Local Area Network while ImageUltra is running.

The first situation can be manifested by adhering to the following steps. First, a request is sent to the AMT on the client system requesting the PCI inventory data to find out what hardware is installed on the system. The server-based ImageUltra process runs its "PNP" rules to generate an ISO image containing only the device drivers applicable to the system. This is done without having to power up the target system. The ISO image is made available on the network. Another request is sent to the AMT on the client system to request an IDE-R mount of the ISO image. Next, a request is sent to AMT to boot ImageUltra. Power is preferably applied to the system to accomplish booting. When the system boots, it will load the ImageUltra software, and assign a drive letter to the RHIIT. After this, normal ImageUltra activities will take over. When these ImageUltra activities are finished, the RHIIT area can be saved on the server for future reuse.

More specifically, AMT (Intel Active Management Technology) contains 24 k of flash ROM space for applications to store data. When the system is plugged in but powered off, the network space is still active, and maintains a network address, such as an IP address. The system is able to communicate with AMT, with the ability to perform many functions such as the ability to retrieve data, get the system serial number, write data to the storage area, and so forth. AMT also provides a set of boot protocols. The IDE-R (Intel's Remote Integrated Driver Electronics) protocol is utilized during the boot. The BIOS connects to remote network share and enables an emulation of the share as an IDE hard drive. These abilities allow the system to perform a method in accordance with the present invention without needing to power up. IDE-R allows gigabytes of space to be available immediately to boot the system up remotely.

The list of drivers is obtained by a specification called Plug n Play. When the power cord is plugged in, the AMT card polls the system to obtain the inventory data and stores the data on the AMT storage space described above. Every device on the PCI bus has a four part ID. When the AMT queries the PCI, it obtains this list of four part IDs that represents the devices on the system. Through the network cable, a request is initiated to obtain that data. The information is sent through the network to the server, allowing the server to have an inventory of that specific system. The server compares the PCI IDs it has just obtained with the drivers that it stores. From the list of stored drivers it maintains, the server selects those drivers specific to the machine and constructs an ISO image that contains only the drivers and applicable system information for that system. Thus, the server creates a custom boot image for that specific system.

Next, that share/ISO image is made available. The AMT on the client is told on its next boot to do an IDE-R connection and give it the name of the share, the server location, and other necessary information. The wait command is sent and then the system is powered up. At this stage, the system boots, sees that it is booting to IDE-R, connects to the network share, mounts the ISO image, and boots that image. The system then begins to do the ImageUltra activities. It takes the data it has, images the hard drive, copies the specific drivers targeted to that system, and puts those on the HIIT area on the server.

The second situation involves providing an arrangement to supply ImageUltra content to a system that may not be connected to the LAN while ImageUltra is running. In this situation, the AMT is enhanced to have more storage, for example 10 MB or 1 Gig. This process again starts with sending a request to on the client system to request the PCI inventory data. The server based ImageUltra process runs its "PNP" rules to generate an ISO image containing only the device drivers applicable to the system. This is also done without powering the target system. The ISO image is made available on the network and then a request is sent to the AMT on the client system to store the ISO image. Power is then preferably applied to the system to accomplish booting. When the user starts ImageUltra, the ImageUltra software will query the cached data for the drivers and the Operating System components that are automatically installed from AMT. Then, normal ImageUltra activities will take over. Once ImageUltra has completed, it could retrieve all the data from AMT and store on either the hard drive or delete the information. Much of this process is similar to that detailed above with regard to the first situation.

In recapitulation, the present invention broadly relates, in accordance with at least one preferred embodiment, to a method for removing the driver map component from being stored on the service partition and instead placing it on a server for retrieval at a later time. Only the actual device drivers that are required for that system will be provided resulting in reduced hard drive waste. A central repository will be provided for applications and device drivers that would leverage the AMT area. The AMT IDE-R would be used to store the hook to network install, for example an IT administrator initiated network install to an unpowered system. There are two main situations in which this method will be used. The first situation involves supplying ImageUltra content to a system that is connected to the Local Area Network while ImageUltra is running. The second situation involves supplying ImageUltra content to a system that is not connected to the Local Area Network while ImageUltra is running.

The present invention, in accordance with at least one preferred embodiment, can be run on a base system. This system needs only a minimum of two (2) cables to be plugged in: the power cable and the network cable. The system should not be powered on, and does not necessarily have to have an Operating System. The power off state of the system also necessitates that the processor is not running and memory is not accessible. Thus, the present invention, in accordance with at least one preferred embodiment, is more advantageous than traditional network boot systems which require the computer to be fully powered throughout the entire process.

The present invention, in accordance with at least one preferred embodiment, can be thought of as a pre-pre Operating System boot system that runs before the Operating System or a Plug n Play loading or storing of drivers. When shipped from the manufacturer, systems that use the instant invention to load an Operating System do not even necessarily need to have a hard drive installed. A customer would be able to install any hard drive they prefer, run the instant invention, and have a functional computer. To a certain extent, the present invention, in accordance with at least one preferred embodiment, can also be thought of as an alternative way to deliver an Operating System or repair an Operating System.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein, it is to be understood that the invention is not limited to those precise embodiments, and that various other changes and modifications may be affected therein by one skilled in the art without departing from the scope or spirit of the invention.

What is claimed is:

1. An apparatus comprising:
   a memory for storing a master image;
   an arrangement for accepting the master image;
   an arrangement for facilitating customization of the master image to the apparatus; and
   an arrangement for removing a driver map from a service partition and storing the driver map on a server, the driver map relating to drivers usable by said arrangement for accepting the master image,
   wherein said accepting arrangement acts to employ active management technology at the apparatus in accepting the master image, and
   wherein said arrangement for facilitating customization acts to permit selection of apparatus specific device drivers.

2. The apparatus according to claim 1, wherein said storing arrangement comprises a table-based index of drivers usable by said arrangement for accepting the master image.

3. The apparatus according to claim 1, wherein said storing arrangement acts to store the driver map at the server for later retrieval.

4. The apparatus according to claim 1, wherein said driver map relates solely to device drivers pertinent to a given apparatus configuration.

5. The apparatus according to claim 1, wherein said arrangement for facilitating customization acts to facilitate the creation of an image with multiple applications for different contexts associated with the apparatus.

6. A method comprising the steps of:
   accepting a master image at an end-user system;
   facilitating customization of the master image to the end-user system; and
   removing a driver map from a service partition and storing the driver map on a server, the driver map relating to drivers usable by said step for accepting the master image,
   wherein said accepting step comprises employing active management technology at the end-user system in accepting the master image, and
   wherein said step of facilitating customization comprises permitting selection of end-user specific device drivers.

7. The method according to claim 6, wherein said storing step comprises providing a table-based index of drivers usable in said step of accepting a master image.

8. The method according to claim 6, wherein said storing step comprises storing the driver map at the server for later retrieval.

9. The method according to claim 6, wherein said driver map relates solely to device drivers pertinent to a given end-user system.

10. The method according to claim 6, wherein said step of facilitating customization comprises facilitating the creation of an image with multiple applications for different contexts associated with an end-user system.

11. A program storage device readable by a machine, tangibly embodying a program of instructions executable by the machine to perform method steps for facilitating the provision of an image at an end-user system, said method comprising the steps of:
   accepting a master image at an end-user system;
   facilitating customization of the master image to the end-user system; and
   removing a driver map from a service partition and storing the driver map on a server, the driver map relating to drivers usable by said step for accepting the master image,
   wherein said accepting step comprises employing active management technology at the end-user system in accepting the master image, and
   wherein said step of facilitating customization comprises permitting selection of end-user specific device drivers.

12. An apparatus comprising:
   a memory for storing a master image;
   an arrangement for accepting the master image;
   an arrangement for facilitating customization of the master image to the apparatus; and
   an arrangement for removing a driver map from a service partition and storing the driver map on a server, the driver map relating to drivers usable by said arrangement for accepting the master image,
   wherein said accepting arrangement acts to variably employ active management technology based on whether the apparatus is connected to or disconnected from a local area network, and
   wherein said arrangement for facilitating customization acts to permit selection of context-specific parameters, wherein said context-specific parameters include at least one of: language and operating system.

* * * * *